(12) United States Patent
Rothleitner (10) Patent No.: US 8,875,905 B2
(45) Date of Patent: Nov. 4, 2014

(54) PLUG ASSEMBLY

(76) Inventor: Craig Rothleitner, Attadale (AU)

( * ) Notice: Subject to any disclaimer, the term of this patent is extended or adjusted under 35 U.S.C. 154(b) by 780 days.

(21) Appl. No.: 12/305,547

(22) PCT Filed: Jun. 19, 2007

(86) PCT No.: PCT/AU2007/000855
§ 371 (c)(1),
(2), (4) Date: Dec. 18, 2008

(87) PCT Pub. No.: WO2007/147204
PCT Pub. Date: Dec. 27, 2007

(65) Prior Publication Data
US 2010/0006161 A1    Jan. 14, 2010

(30) Foreign Application Priority Data

| | | |
|---|---|---|
| Jun. 19, 2006 | (AU) | 2006903282 |
| Oct. 9, 2006 | (AU) | 2006905600 |
| Jan. 17, 2007 | (AU) | 2007900209 |
| Feb. 14, 2007 | (AU) | 2007900745 |
| Apr. 13, 2007 | (AU) | 2007901941 |

(51) Int. Cl.
| | |
|---|---|
| *F16L 55/24* | (2006.01) |
| *B01D 35/04* | (2006.01) |
| *B01D 29/03* | (2006.01) |
| *E04G 21/32* | (2006.01) |
| *F16L 55/11* | (2006.01) |
| *F16L 55/115* | (2006.01) |
| *E04G 21/30* | (2006.01) |

(52) U.S. Cl.
CPC ............... *E04G 21/30* (2013.01); *B01D 35/04* (2013.01); *B01D 29/03* (2013.01); *E04G 21/3204* (2013.01); *F16L 2201/80* (2013.01); *F16L 55/1141* (2013.01); *F16L 55/115* (2013.01)
USPC ............... 210/460; 210/463; 210/474; 4/287; 138/41; 138/96 R (58) Field of Classification Search
USPC ......... 210/163, 164, 459, 460, 462, 463, 474; 4/287, 292; 138/41, 44, 89, 96 R, 96 T
See application file for complete search history.

(56) References Cited

U.S. PATENT DOCUMENTS

| | | | | |
|---|---|---|---|---|
| 555,831 | A | * | 3/1896 | Stiner ........................ 210/460 |
| 1,898,382 | A | * | 2/1933 | Mullaney .................... 210/462 |
| 2,695,411 | A | | 11/1954 | Vinokor |
| 3,490,488 | A | | 1/1970 | Grist |
| 4,302,918 | A | | 12/1981 | Rautilo |

(Continued)

FOREIGN PATENT DOCUMENTS

| | | |
|---|---|---|
| AU | 2005239719 B1 | 7/2006 |
| DE | 19518840 A1 | 11/1996 |
| GB | 2321041 A | 7/1998 |

*Primary Examiner* — Christopher Upton
(74) *Attorney, Agent, or Firm* — Matthew J. Lattig; Charter IP, LLC (57) ABSTRACT

A plug assembly (11) adapted to be received in an opening at a first end of a pipe (13) for preventing debris passing therein. The plug assembly (11) comprises a first portion (21) adapted to be received in the opening, and a second portion (23) to ensure the first portion (21) does not move inwardly away from the opening. The plug assembly (11) also comprises a drainage means (33) to allow fluid to pass through the plug assembly (11).

37 Claims, 7 Drawing Sheets

(56) References Cited

U.S. PATENT DOCUMENTS

| | | |
|---|---|---|
| 4,655,256 A | 4/1987 | Lasota et al. |
| 4,671,976 A | 6/1987 | Vidal |
| 4,807,415 A | 2/1989 | Oak |
| 5,431,815 A * | 7/1995 | Te-Shin ................. 210/463 |
| 6,244,006 B1 * | 6/2001 | Shue et al. .................. 52/302.1 |
| 6,416,674 B1 * | 7/2002 | Singleton et al. ............. 210/163 |
| 6,595,243 B2 | 7/2003 | Tarr |
| 2004/0200525 A1 | 10/2004 | Goodson et al. |
| 2007/0144600 A1 * | 6/2007 | Moreau et al. .................. 138/89 |

* cited by examiner

PLUG ASSEMBLY

BACKGROUND

1. Field of the Invention

Example embodiments in general relate to a liquid permeable plug assembly to prevent debris entering a hole, such as that provided in a pipe/conduit.

2. Related Art

During civil works, such as the construction of a building, conduits for plumbing and electrical cabling need to be set out prior to the pouring of the concrete slab. Once the slab sets, these conduits are fixed therein. In certain applications these pipes may stand proud of the upper surface of the slab.

Whilst the slab is generally one of the first stages in a construction phase, the installation of the electrical and plumbing works does not take place until some time later. This time delay means that the conduits are exposed to the harsh environment of a construction site, weather conditions, as well as constant traffic. As a result, the conduits are often damaged and regularly fill with debris. Once the conduit fills with debris it becomes difficult and laborious to clear the conduit before the electrical and/or plumbing work begins.

One way of overcoming these problems is to place tape or a plastic cap over the opening of the conduit to prevent the ingress of debris into the conduit. However, tape is often torn from the conduit, or the cap cracks exposing the conduit's opening.

The placing of tape or cap over the opening is often done after the section of the pipe protruding above the concrete slab is removed, leaving the opening substantially flush with the slab.

On a construction site it is also necessary to provide good drainage such that when liquid pools on the slab it quickly drains away. Hence, it is desirable for the conduits to remain clear to facilitate drainage. If the conduits become blocked with debris liquid takes a longer time to drain away, creating a hazardous work site.

A similar problem occurs in the oil and gas industry in which the prevention of debris entering into pipes is highly desirable. Currently once a pipe has been manufactured, a plastic cap is attached to each end to prevent the ingress of dirt. During transportation and storage these caps are often damaged and may break off completely or may break leaving a core of the cap in or around the pipe end. Once the cap is broken dirt and water enter the pipe causing the pipe to rust. When this occurs the pipe must be cleaned using high pressure water and may further require to be blasted with nitrogen before the pipe can be installed.

The preceding discussion of the background to the invention is intended only to facilitate an understanding of the present invention. It should be appreciated that the discussion is not an acknowledgement or admission that any of the material referred to was part of the common general knowledge as at the priority date of the application.

SUMMARY

An example embodiment of the present invention is directed to a plug assembly adapted to be received relative to an opening at a first end of a pipe for preventing debris passing therein. The plug assembly includes a first portion adapted to be received relative to the opening and being fixedly connected to a substantially planar second portion to hold the first portion in position when the plug assembly is positioned relative to the opening. The second portion includes a region made from a porous material which allows fluid to readily permeate through the plug assembly and pipe. The fluid may pass in either direction through the plug assembly without debris passing through with the fluid.

Another example embodiment is directed to a plug assembly, adapted to be fitted relative to an opening to prevent debris passing therein. The plug assembly includes a first portion adapted to be received in or around the opening, a second portion connected to the first portion and holding the first portion in position, and drainage means incorporated in the second portion to allow fluid to pass through the plug assembly.

Another example embodiment is directed to a plug assembly adapted to be received in an opening at a first end of a pipe for preventing debris passing therein. The plug assembly includes a first portion adapted to be received in the opening, a second portion to ensure the first portion does not move inwardly away from the opening, and drainage means incorporated in the second portion to allow fluid to pass through the plug assembly.

The first portion may be cylindrical in shape. The shape of the first portion is chosen to compliment the first end of the pipe. In an example, the first portion is snugly received in the pipe.

The first portion may be hollow.

The first portion may have an opening at a first end. The first portion may have an end wall at a second end, whereby debris which may enter the conduit is collected in the first portion. The first portion may provide a receptacle to contain debris.

The second portion may be fixedly connected to the first portion.

In one example, the second portion is secured to the first end of the first portion. The second portion may be substantially planar when in a normal condition. The first end of the first portion may be fixedly connected to a first surface of the second portion at a central region thereof.

In another example the second portion is secured to the end wall of the first portion.

The second portion may be adapted to be secured with respect to the opening. In one example the second portion may be adapted to be secured to a surface in the proximity of the pipes first end. This will allow the plug assembly to be retained in place until such time as the pipe is required. The second portion may be secured by gluing a section of the second portion to the surface, such as the slab.

In another example the second portion is adapted to be secured to the pipe.

In an example the second portion may be flexible.

The second portion may be constructed from a shock absorbent material.

In one example the drainage means is incorporated in the first portion. The drainage means may also be incorporated in the second portion.

In a further example the first portion is hollow and the drainage means is incorporated in the second portion such that it aligns with the hollow section of the first portion such that liquid may pass therethrough.

At least a portion of the plug assembly which aligns with the opening of the pipe is made from a liquid permeable material such that the liquid may pass therethrough to provide the drainage means. In an example the material can be flexible and have high wear resistant and shock absorbing properties.

The plug assembly may incorporate a third portion adapted to be received around the outer surface of the pipe adjacent the opening when the plug assembly is fitted to the pipe. The third portion may be a hollow cylinder and is preferably coaxially mounted on the second portion with respect to the first portion. The third portion may be fixedly secured to the second portion.

The second portion may be positioned relative to the first portion such that the wall of the pipe adjacent the pipe opening is received between the first and third portion. In an example the pipe wall is snugly received between the first and third portion such that there is an interference fit there between. This may assist in retaining the plug assembly on the end of the pipe.

In one example the diameter of the second portion can be equal to the outer diameter of the third portion.

In one example the third portion may be flexible.

The third portion may be adapted to be releasably secured to the outside of the pipe at a first position remote from the pipe end. At a first position of the pipe the pipe diameter may vary from the diameter at the pipe end. The third portion may be secured at the first position.

In those cases where the pipe incorporates a flange at its end, the section of the third portion extending beyond the flange may be clamped to the first position of the pipe. In this case the diameter at the first position is narrower than at the end of the pipe. In other cases the pipe end may be narrower than at the first position. In this case the pipe end will not be snugly received between the third and first portion, but the third portion will be clamped at the first position of the pipe to hold the plug assembly in place.

The material may also be resilient. The selection of the material can provide the plug assembly the ability to withstand a degree of impact from items being dropped thereupon or vehicles passing over them.

The material may provide a filter means to prevent preselected fluids from passing therethrough.

The material may be selected to provide a desired fluid flow rate therethrough. In one example the plug assembly, or a part thereof, may be constructed from a textile material.

In another example the plug assembly, or a part thereof, may be constructed from a flexible mesh such as woven stainless steel.

In an example the material of the plug assembly may exhibit high wear resistant properties.

Another example embodiment is directed to a plug assembly which is adapted to be received in a first end of a pipe for preventing debris passing therein. The plug assembly includes a first portion adapted to be received in the first end, and a second portion planar in shape and connected to the first portion. The second portion holds the first portion in position when the plug assembly is positioned relative to the first end. The first portion and second portion can be constructed from a resilient liquid permeable material to provide a drainage means.

Another example embodiment is directed to a plug assembly which is adapted to be received in a first end of a pipe for preventing debris passing therein. The plug assembly includes a first portion being generally hollow and cylindrical in shape and adapted to be received in the first end, and a second portion planar in shape and connected to the first portion. The second portion holds the first portion in position when the plug assembly is positioned relative to the first end. The second portion can be constructed from a resilient liquid permeable material to provide the plug assembly with a drainage means.

Another example embodiment is directed to a plug assembly adapted to be received relative to a first end of a pipe for preventing debris passing therein. The plug assembly includes a first portion adapted to be received over the first end, a second portion to hold the first portion in position, and a drainage means incorporated in the second portion to allow fluid to pass through the plug assembly.

Another example embodiment is directed to a plug assembly adapted to be received relative to a first end of a pipe for preventing debris passing therein. The plug assembly includes a first portion adapted to be received in an opening of a first end, a third portion adapted to be received over the first end such that a portion of the pipe adjacent the opening is received between the first portion and third portion, a second portion to hold the first portion and third portion in position, and a drainage means incorporated in the second portion to allow fluid to pass through the plug assembly.

Another example embodiment is directed to a plug assembly adapted to be received in a first end of a pipe for preventing debris passing therein. The plug assembly includes a first portion adapted to be received in the first end and a second portion having a first end secured to the first portion. The second portion has a second end secured to the pipe or nearby surface to retain the first portion in position when the plug assembly is positioned relative to the pipe's first end. The second portion permits the first portion to be removed from the pipe. The first portion has a region made from a porous material which allows fluid to readily permeate through the plug assembly and pipe. The fluid may pass in either direction through the plug assembly without debris passing through with the fluid.

Another example embodiment is directed to a plug assembly which is adapted to be received in a first end of a pipe for preventing debris passing therein. The plug assembly includes a first portion adapted to be received in the first end and a second portion having a first end secured to the first portion. The second portion has a second end secured to the pipe or nearby surface to retain the first portion in position when the plug assembly is positioned relative to the pipe's first end, and the second portion allows the first portion to be removed from the pipe. The first portion can be constructed from a resilient liquid permeable material so as to provide a drainage means.

Another example embodiment is directed to a plug assembly adapted to be received relative to a first end of a pipe for preventing debris passing therein. The plug assembly includes a first portion adapted to be received in an opening of a first end, and a third portion adapted to be received over the first end such that a portion of the pipe adjacent the opening is received between the first portion and third portion. The third portion is adapted to be clamped to a first position on the pipe remote from the pipe end. The plug assembly includes a second portion to hold the first portion and third portion in position, and a drainage means that is incorporated in the second portion to allow fluid to pass through the plug assembly.

Another example embodiment is directed to a plug set adapted to be fitted relative to an opening of a pipe to prevent debris passing therein. The plug set includes a first plug assembly and a guard, wherein the plug set has a drainage means to allow fluid to pass through the plug set.

Another example embodiment is directed to a plug set adapted to be fitted relative to an opening of a pipe to prevent debris passing therein. The plug set includes a first plug assembly, a guard and a second plug assembly, wherein the plug set has a drainage means to allow fluid to pass through the plug set.

Another example embodiment is directed to a plug set adapted to be fitted relative to an opening of a pipe to prevent debris passing therein, the pipe having a flange at the end to which the plug set is to be fitted. The plug set includes a first plug assembly, a guard and a second plug assembly, wherein the plug set has a drainage means to allow fluid to pass through the plug set.

The first plug assembly can include a first portion adapted to be received in or around the opening and a second portion connected to the first portion, with the second portion holding the first portion in position. The first plu assembly includes a drainage means to allow fluid to pass through the plug assembly.

The guard may comprise a disc. In an example the disc has an aperture therein which aligns with the opening of the pipe when in position. The guard may also comprise a sidewall extending from the periphery of the disc at an angle substantially ninety degrees thereto. In an example the diameter of the guard is such that the flange of the pipe fits snugly within the sidewall of the guard. The guard may be made from an impact resistance material such as a polycarbonate resin thermoplastic (e.g. Lexan®).

The second plug assembly may be adapted to fit over the guard when the guard is positioned over the flange. The second plug assembly comprises a third portion in the form of a sidewall extending from the periphery of a fourth portion.

The third portion may be flexible such that when in place it may be caused to engage the pipe at a first position of the pipe remote from its end. The third portion may be clamped to the pipe using a cable tie or other clamping means. The fourth portion may be of the same or slightly larger diameter than the flange.

The first plug assembly and second plug assembly may be partially or wholly made from a material which will allow fluid to pass therethrough and hence provide the drainage means. The guard drainage means may be provided by the aperture.

Another example embodiment is directed to a plug set adapted to be fitted relative to an opening of a pipe to prevent debris passing therein and to protect the end of the pipe, where the pipe end has a flange to which the plug set is to be fitted. The plug set includes a first plug assembly, a guard and a second guard, wherein the plug set or a component thereof is impact resistant.

The porous material mentioned above is a material which has minute openings which allow fluids to permeate therethrough.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limitative of the example embodiments herein

DETAILED DESCRIPTION

Figure 1:
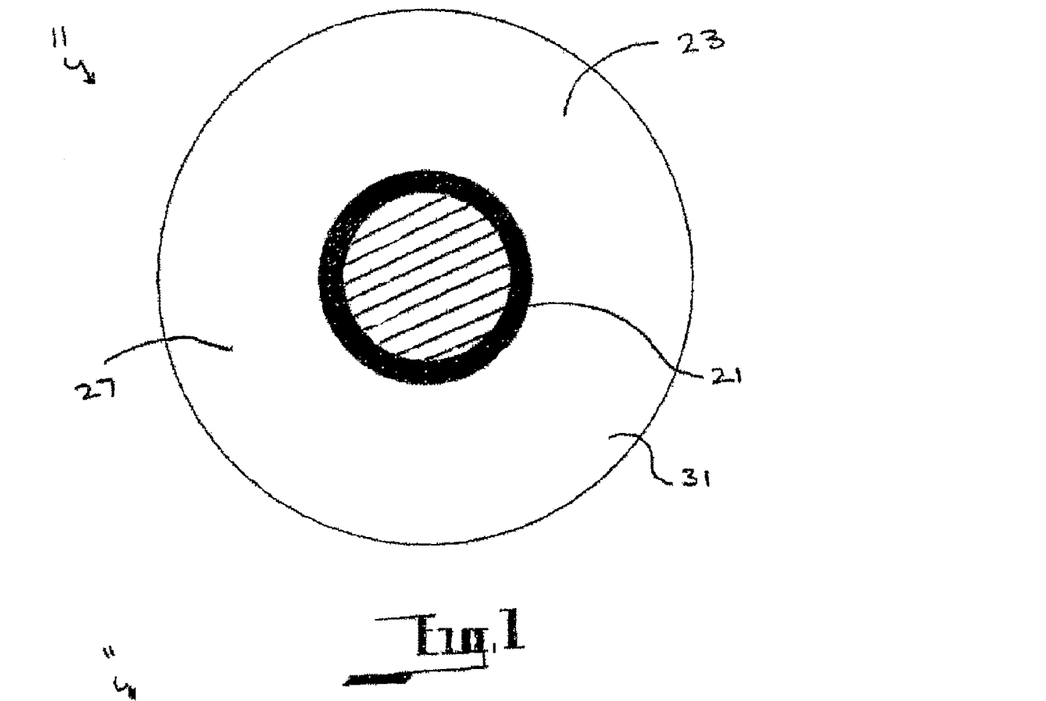
FIG. 1 is a bottom view of a plug assembly according to a first embodiment of the invention.
Figure 2:
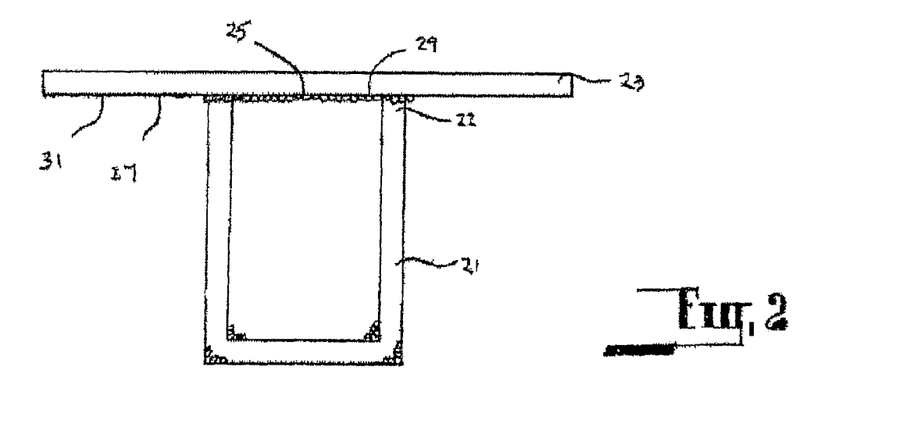
FIG. 2 is a cross sectional side view of FIG. 1.

Referring to FIGS. 1 and 2, the first embodiment is directed to a plug assembly 11 for insertion into a pipe 13. Typically during building construction, the pipe work for plumbing and electrical services are laid out prior to the pouring of the concrete for a slab 19. The pipe work therefore is incorporated in the building structure from the early phase of construction.

The plug assembly 11 comprises a first portion 21 fixedly connected to a second portion 23. As shown in FIG. 2 the first portion 21 is fixedly connected to the second portion 23 by stitching 29. It is understood, however, that any other means of fixedly connecting the first portion 21 and second portion 23 together, such as by gluing, is covered in the scope of the present invention. They may even be integral. The second portion 23 holds the first portion 21 in the opening of the pipe 13 when the plug assembly 11 is positioned to provide a barrier across the opening of the pipe 13.

The first portion 21 is hollow, cylindrical in shape and is of a diameter such that the first portion 21 will be snugly located in the pipe 13 when received in the first end 15 of the pipe 13. The first portion 21 has a first end 22 fixedly connected to the second portion 23 at a central region 25 located on a first surface 27 thereof.

The second portion 23 is planar in shape and extends in a radial direction beyond the central region 25 to provide a securing surface 31 which may be secured to a surface 17 of the slab 19. The securing surface 31 may be secured to the surface 17 by any means known to the person skilled in the art. It is expected, however, that this will generally be by way of gluing. When the securing surface 31 is secured to the surface 17, the plug assembly 11 is secured in place to provide a barrier across the pipes opening.

The plug assembly 11 also comprises a drainage means 33 which allows liquid, such as water, to pass through the plug assembly 11 and drain through the pipe, without diminishing the plug assembly's 11 ability to provide a barrier to the ingress of debris. In the embodiment shown, the material from which the plug assembly 11 is constructed provides the drainage means 33. The material is permeable, allowing liquid to pass therethrough.

In the present embodiment the material is also resilient so as to provide the plug assembly 11 with shock absorbing properties. Hence, when the plug assembly 11 is in position, the pipe 13 will be protected from objects falling thereupon or vehicles passing over the pipe.

Figure 3:
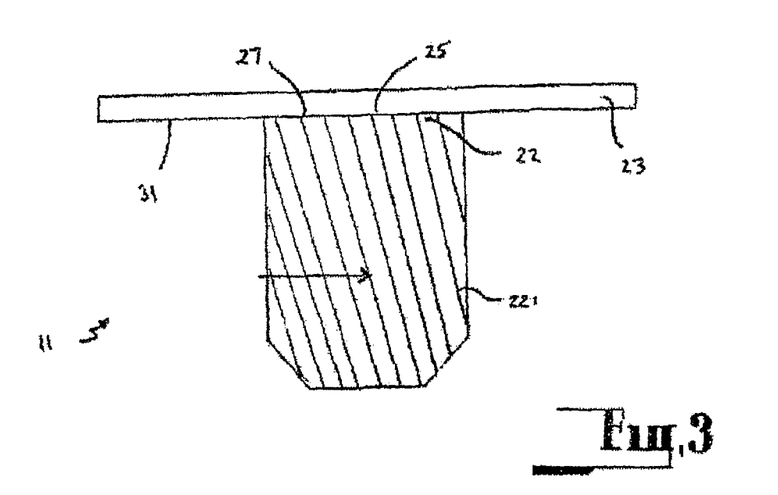
FIG. 3 is a side view of a plug assembly according to a second embodiment of the invention.
Figure 4:
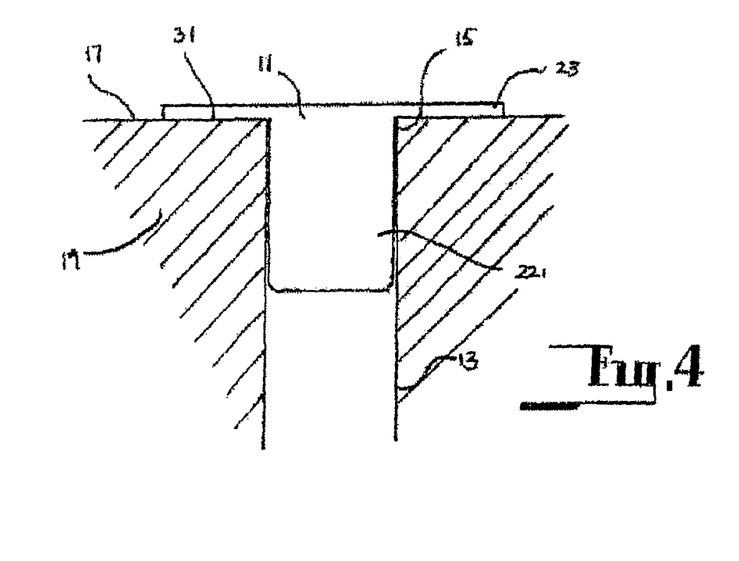
FIG. 4 is a cross sectional side view of a pipe having the plug assembly depicted in FIG. 3 shown therein.

FIGS. 3 and 4 illustrate a plug assembly 11 according to a second embodiment. The difference between this plug assembly 11, and the plug assembly 11 according to the first embodiment is in relation to the first portion 221. In this embodiment the first portion 221 is solid. This plug assembly 11 may be particularly suited to those pipes 13 located in high traffic areas.

In use, the plug assembly 11 is selected according to the size of the pipe 13. As there is a limited number of different diameter pipes used in construction it will not be necessary to have a vast range of different sized plug assemblies 11. The first portion 221 is inserted in the first end 15 of the pipe 13 until the first surface 27 of the second portion 23 engages or is adjacent to the first end 15. The securing surface 31 is then glued to the surface 17 of the slab 19 to hold the plug assembly 11 in position relative to the pipe 13.

When the plumbing and/or electrical work commences the plug assembly 11 can be easily removed from the pipe 13.

On some construction sites a first end 15 of the pipe 13 protrudes above the surface 17 of the slab. Where the pipe 13 protrudes by only a small amount, the securing surface 31 of the second portion 23 may still be secured to the slab's surface 17 as the second portion 23 is flexible. However, where the pipe 13 extends by a larger amount, the securing surface 31 will need to be secured to the outside of the pipe 13 adjacent the pipe's first end 15.

Figure 5:
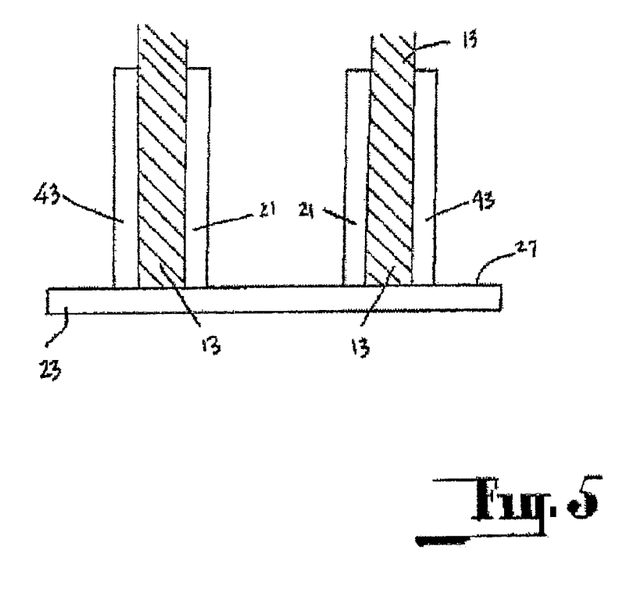
FIG. 5 is a side cross sectional view of a plug assembly according to a third embodiment positioned on a pipe.
Figure 6:
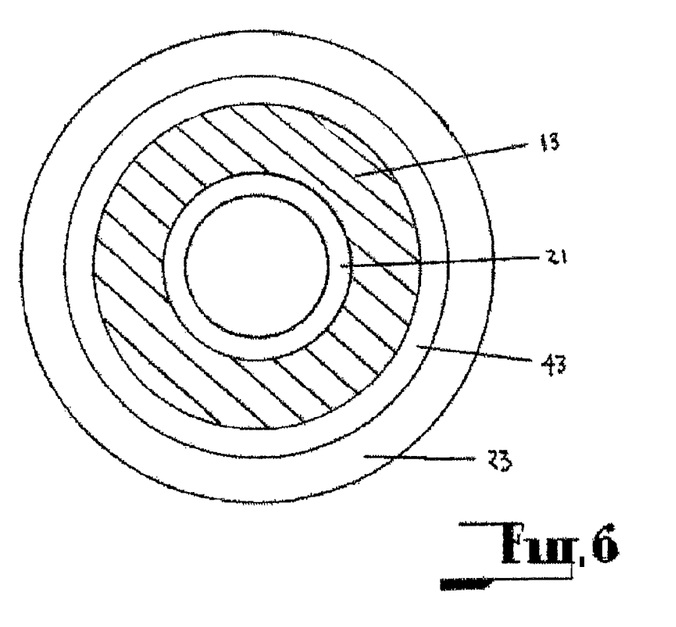
FIG. 6 is an end view through section 6-6 of FIG. 5.

Referring to FIGS. 5 and 6 a further example embodiment is shown. This embodiment may be particularly suited to pipes which may be transported and/or are not secured within a medium, such as those in the construction industry. For instance, this embodiment has applications in the oil and gas industry in which it is important for pipes to remain free from unwanted debris, such as during transportation and storage, for example.

As can be seen in FIG. 5 a plug assembly 41 is positioned over the end of a pipe 13. This plug assembly 41 is substantially identical to that described above in the first embodiment with the addition of a third portion 43. The third portion 43 is cylindrical in shape and is fixedly mounted on the first surface 27 of the second portion 23 so as to be co-axially mounted with respect to the first portion 21. The third portion 43 acts as a sleeve which is fitted to the external surface of the pipe 13. The space between the first portion 21 and third portion 43 is such that the wall of the pipe is snugly received there between. This ensures the plug assembly 41 is releasably retained over the opening of the pipe 13.

In alternative embodiments the plug assembly 41 may be glued, zipped, tied or clamped by other means to the pipe end to hold it in place.

Figure 7:
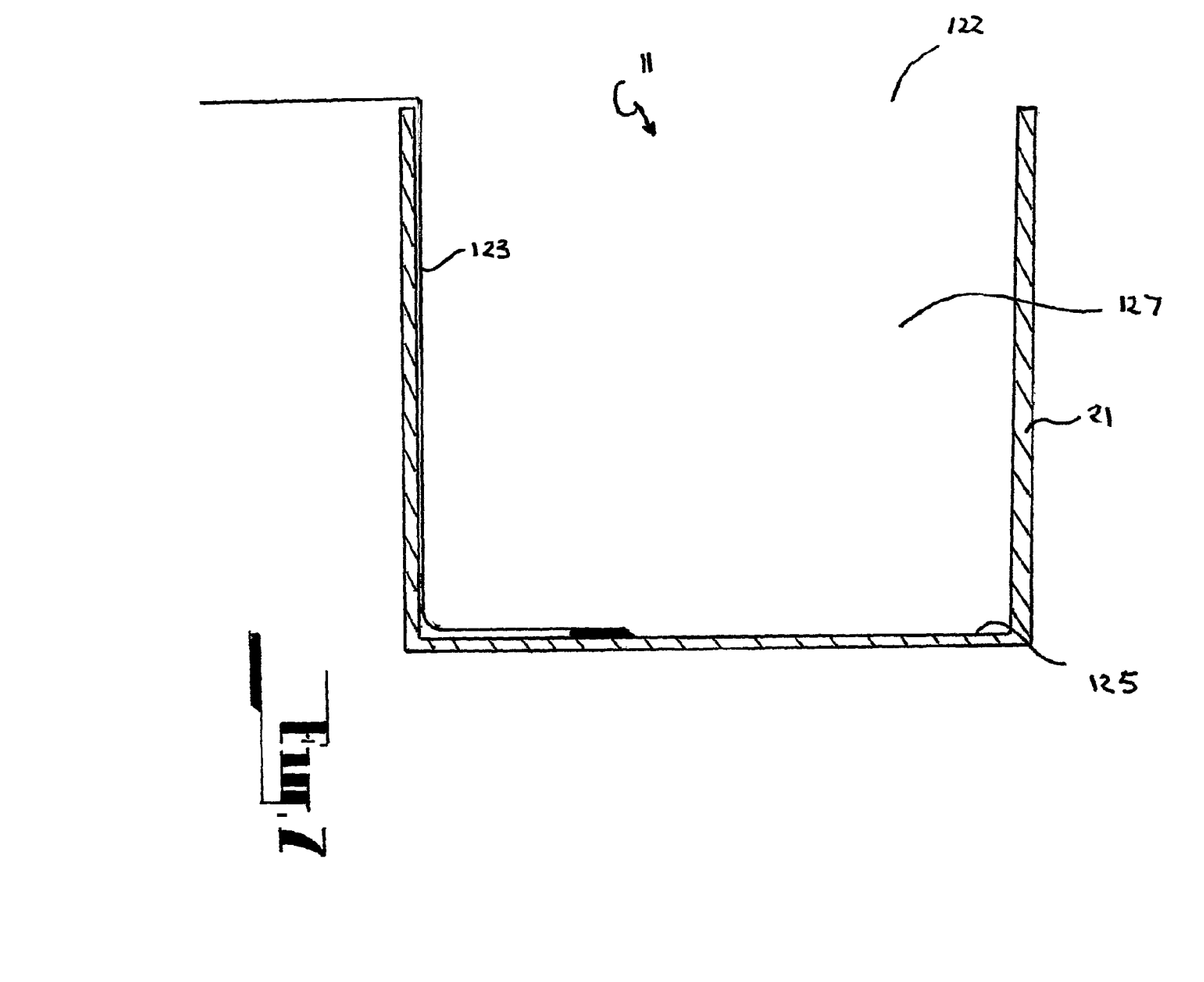
FIG. 7 is a cross sectional side view of a plug assembly according to a fourth embodiment.

Referring to FIG. 7, a fourth example embodiment is shown in the form of a plug assembly 11 for insertion into a pipe. The plug assembly 11 comprises a second portion 123 fixedly connected to a first portion 21. It is understood that any means of fixedly connecting the first portion 21 and second portion 123 together, such as by gluing, is covered in the scope of the present invention.

The first portion 21 is hollow, cylindrical in shape and is of a diameter such that the first portion 21 will be snugly located in the pipe when received in the first end of the pipe 13. The first portion 21 has an open first end 122 and a closed second end 125 to define a receptacle 127.

The second portion 123 retains the first portion 21 in position when the plug assembly 11 is positioned to provide a barrier across the opening of the pipe 13.

The second portion 123 is flexible and is adapted to be secured to a surface of the slab. The second portion 123 may be secured to the surface by any means known to the person skilled in the art. It is expected, however, that this will generally be by way of gluing. When the second portion 123 is secured to the surface, the plug assembly 11 is retained in place to provide a barrier through which debris can not enter further into the pipe. Furthermore, owing to the shape of the first portion the plug assembly acts to contain any debris entering therein which may be entered from the plug assembly.

The plug assembly 11 also comprises a drainage means 33 which allows liquid, such as water, to pass through the plug assembly and drain through the pipe, without diminishing the plug assembly's 11 ability to contain debris. In the embodiment shown, the material from which the plug assembly 11 is constructed provides the drainage means 33. The material is permeable, allowing the liquid to pass therethrough.

Figure 8:
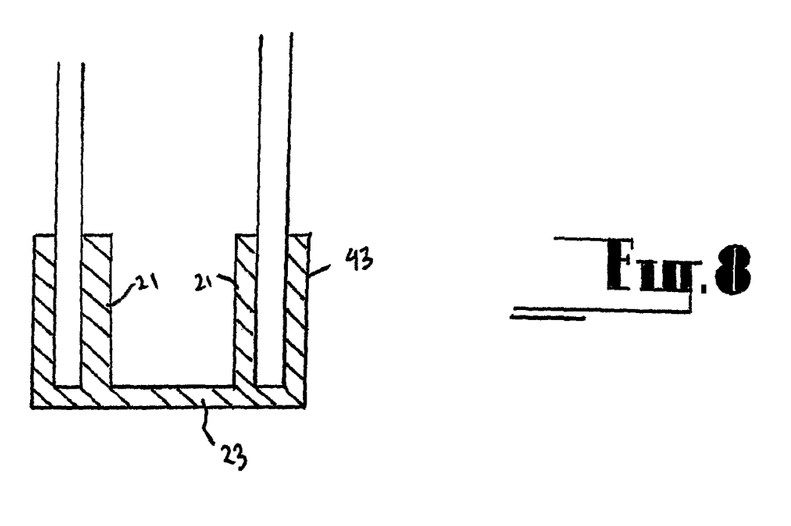
FIG. 8 is a cross sectional side view of a plug assembly according to a fifth embodiment.

FIG. 8 shows a fifth embodiment which is similar to the third embodiment shown in FIGS. 5 and 6. In this embodiment the third portion 43 is connected adjacent to the periphery of the second portion 23.

Figure 9:
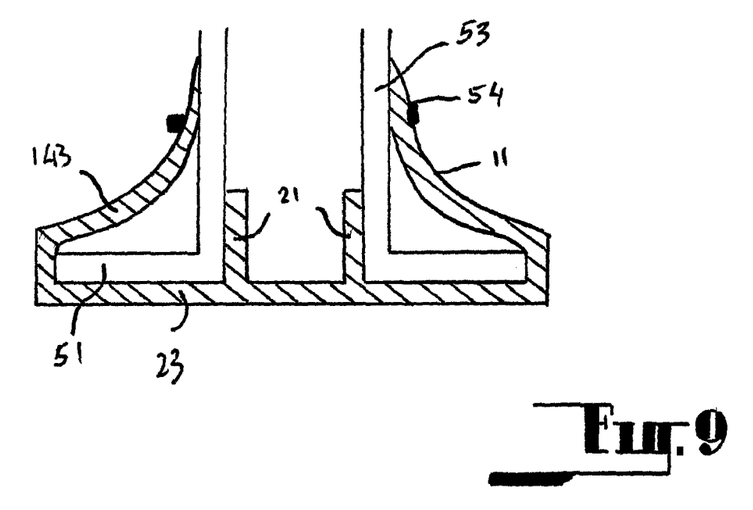
FIG. 9 is a cross sectional side view of a plug assembly according to a sixth embodiment.

Referring to FIG. 9 a sixth example embodiment is shown. This embodiment is similar to that shown in FIG. 8 but has been constructed so as to be suited to a pipe which incorporates a flange 51 at the end to which the plug assembly 11 is to be fitted. The third portion 143 of this embodiment is adapted to be clamped at a first position 53 of the pipe remote from its end. A cable tie 54 may be used to clamp the third portion 143 thereto to retain the plug assembly 11 in position. Again the first portion 21 is snugly received within the bore of the pipe. It is envisaged, however, that in other embodiments the first portion 21 may not be required.

Figure 10:
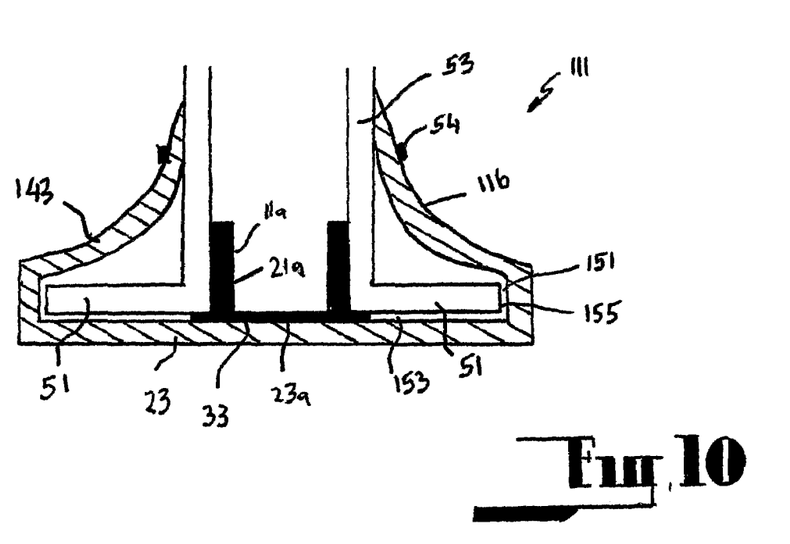
FIG. 10 is a cross sectional side view of a plug assembly according to a seventh embodiment.

Referring to FIG. 10 a seventh example embodiment is shown. This embodiment may be particularly suited to a pipe which incorporates a flange 51 at the end to which the plug assembly 11 is to be fitted. This embodiment shows a plug set 111 comprising a first plug assembly 11 a, a guard 151 and a second plug assembly 11 b, all which cooperate to provide a drainage means for the plug set 111.

The first plug assembly 11 a is substantially as depicted in FIGS. 1 and 2 and as described in the first embodiment of this invention with the exception that the first portion is in the form of a hollow cylinder 21 a.

Figure 11:
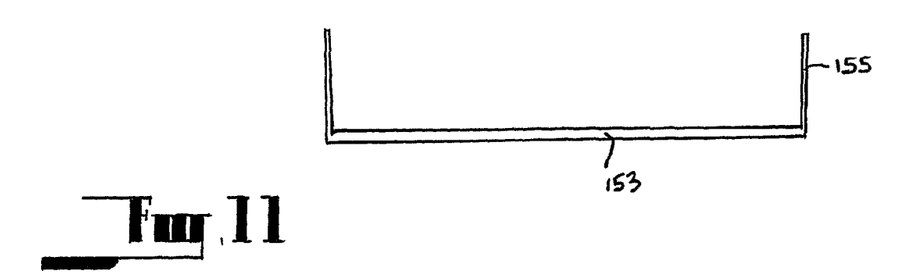
FIG. 11 is a cross sectional side view of a guard depicted in FIG. 10.
Figure 12:
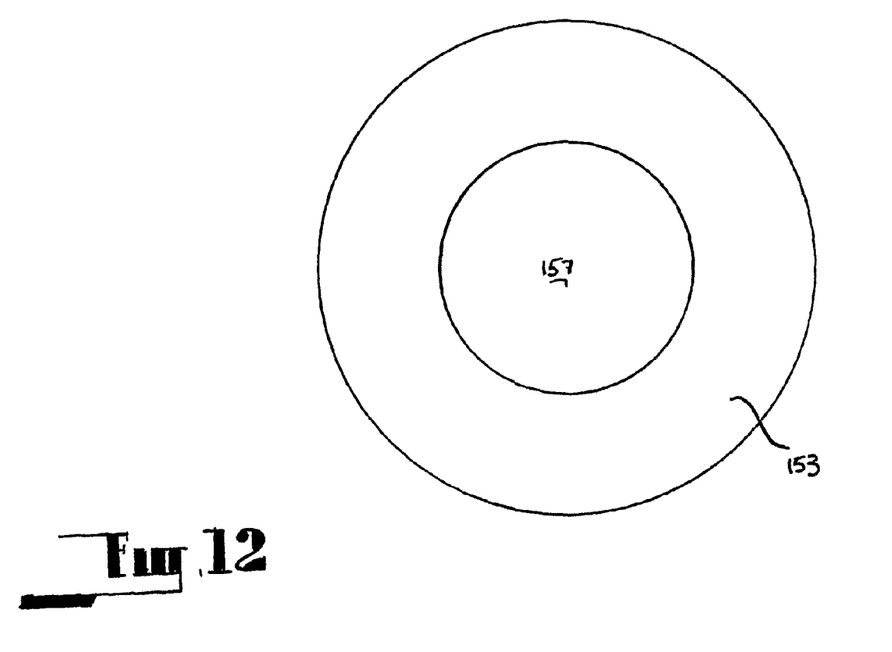
FIG. 12 is a plan view of the guard shown in FIG. 11.

The guard 151 is further illustrated in FIGS. 11 and 12 and comprises a disc 153 having a sidewall 155 extending from the periphery of the disc 153. The guard 151 is of sufficient size such that the flange 51 is snugly received within the confines of the sidewall 155. In this embodiment the disc 153 has an aperture 157 which aligns with the opening of the pipe when in position. The aperture 157 forms part of the drainage means 33 of the plug set 111 to allow liquid and air to travel therethrough to allow the pipe to remain relatively dry. The aperture 157 is of sufficient diameter to receive the second portion 23a of the first plug assembly 11 a. It is envisaged, however, that in other embodiments the disc 153 may not contain an aperture 157. It is also envisaged that the guard 151 may not require the sidewall 155.

The guard 151 is made from an impact resistance material such as a polycarbonate resin thermoplastic (e.g. Lexan®).

The second plug assembly 11 b is substantially as described in the sixth embodiment and as shown in FIG. 9, with the exception that the hollow cylinder 21 is not present. The plug set 111 of the seventh embodiment provides robust protection for the flange end of a pipe during transportation and storage whilst allowing fluid and air to pass therethrough.

It is to be understood that the shape of the first portion 21 of the plug assembly may take any form and will be based upon the shape of the pipe.

It is also to be understood that the plug assembly may be used in multiple industries such as oil and gas, civil works and other infrastructure projects, mining, and marine.

Modifications and variations such as would be apparent to the skilled addressee are considered to fall within the scope of the present invention.

Throughout the specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A plug assembly adapted to be received relative to an opening at a first end of a pipe for preventing debris passing therein, comprising:
   a first portion adapted to be received relative to the opening, and
   a substantially planar second portion,
   the first portion being fixedly connected to a first surface of the second portion to hold the first portion in position when the plug assembly is positioned relative to the opening, a second surface of the second portion presenting a substantially flat surface covering and extending beyond the first portion, the second portion having a region made from a porous material which allows fluid to readily permeate through the plug assembly and pipe,
   wherein the fluid may pass in either direction through the plug assembly without debris passing through with the fluid.

2. The plug assembly according to claim 1 wherein the first portion is cylindrical in shape and compliments the first end of the pipe.

3. The plug assembly according to claim 1 wherein the first portion is snugly received in the opening of the pipe.

4. The plug assembly according to claim 1 wherein the first portion is received around the first end of the pipe.

5. The plug assembly according to claim 1 wherein the first portion is hollow, the porous region of the second portion aligning with the hollow section of the first portion to allow fluid to pass therethrough.

6. The plug assembly according to claim 1 wherein the first portion is made from the same porous material.

7. The plug assembly according to claim 1 wherein the second portion is entirely formed from the porous material.

8. The plug assembly according to claim 1 wherein a first end of the first portion is fixedly connected to the first surface of the second portion at a central region thereof.

9. The plug assembly according to claim 1 wherein the second portion is adapted to be secured with respect to the opening.

10. The plug assembly according to claim 1 wherein the second portion is adapted to be secured to a surface in the proximity of the pipes first end.

11. The plug assembly according to claim 1 wherein the second portion is adapted to be secured to the pipe.

12. The plug assembly according to claim 1 wherein the plug assembly further comprises a third portion fixedly secured to the second portion and adapted to be received around the outer surface of the pipe adjacent the opening when the plug assembly is fitted to the pipe, the third portion being a hollow cylinder, coaxially mounted on the second portion with respect to the first portion such that the wall of the pipe adjacent the pipe opening is received between the first and third portions when the plug assembly is in position.

13. The plug assembly according to claim 12 wherein the pipe wall is snugly received between the first and third portion such that there is an interference fit there between.

14. The plug assembly according to claim 12 wherein the diameter of the second portion is equal to the outer diameter of the third portion.

15. The plug assembly according to claim 12 wherein the third portion is adapted to be releasably secured to the outside of the pipe at a first position remote from the pipe end.

16. The plug assembly according to claim 12 wherein the third portion is made from the porous material.

17. The plug assembly according to claim 1 wherein the porous material is flexible, resilient, wear resistant and/or shock absorbent.

18. The plug assembly according to claim 1 wherein the porous material provides a filter means to prevent preselected fluids from passing therethrough.

19. The plug assembly according to claim 1 wherein the porous material provides a desired fluid flow rate therethrough.

20. A plug set adapted to be fitted relative to an opening of a pipe to prevent debris passing therein, comprising:
    a first plug assembly recited in claim 1,
    a guard, and
    a second plug assembly,
    wherein the first plug assembly, the guard, and the second plug assembly co-operate to provide the plug set with a drainage means to allow fluid to pass through the plug set.

21. The plug set according to claim 20 wherein the pipe has a flange at an end to which the plug set is to be fitted.

22. The plug set according to claim 21 wherein the guard comprises a disc.

23. The plug set according to claim 22 wherein the guard comprises a sidewall extending from the periphery of the disc at an angle substantially ninety degrees thereto.

24. The plug set according to claim 23 wherein the diameter of the guard is such that the flange of the pipe fits snugly within the sidewall of the guard.

25. The plug set according to claim 20 wherein the guard has an aperture therein which aligns with the porous material of the first plug assembly as well as the opening of the pipe when in position.

26. A plug set adapted to be fitted relative to an opening of a pipe to prevent debris passing therein, comprising:
    a plug assembly as recited in claim 1, and
    a guard,
    wherein the plug assembly and the guard co-operate to provide the plug set with a drainage means to allow fluid to pass through the plug set.

27. The plug set according to claim 26 wherein the pipe has a flange at an end to which the plug set is to be fitted.

28. The plug set according to claim 27 wherein the guard comprises a disc.

29. The plug set according to claim 28 wherein the guard comprises a sidewall extending from the periphery of the disc at an angle substantially ninety degrees thereto.

30. The plug set according to claim 29 wherein the diameter of the guard is such that the flange of the pipe fits snugly within the sidewall of the guard.

31. The plug set according to claim 26 wherein the guard has an aperture therein which aligns with the porous material of the plug assembly as well as the opening of the pipe when in position.

32. A plug assembly adapted to be received in a first end of a pipe for preventing debris passing therein, comprising:
    a first portion adapted to be received in the first end, and
    a second portion planar in shape and connected to the first portion so as to cover and extend beyond the first portion, the second portion holding the first portion in position when the plug assembly is positioned relative to the first end, the first portion and second portion being constructed from a porous, resilient, liquid permeable material to provide a drainage means.

33. A plug set adapted to be fitted relative to an opening at an end of a pipe to prevent debris passing therein, the pipe having a flange at the end to which the plug set is to be fitted, comprising:
    a first plug assembly,
    a guard, and
    a second plug assembly, wherein the first plug assembly, the guard, and the second plug assembly co-operate to provide the plug set with a drainage means to allow fluid to pass through the plug set, wherein the first plug assembly further comprises:
- a first portion adapted to be received relative to the opening, and
- a substantially planar second portion,
- the first portion being fixedly connected to the second portion to hold the first portion in position when the plug assembly is positioned relative to the opening, the second portion having a region made from a porous material which allows fluid to readily permeate through the first plug assembly and pipe,
- wherein the fluid may pass in either direction through the first plug assembly without debris passing through with the fluid,
- wherein the guard has an aperture therein which aligns with the porous material of the first plug assembly as well as the opening of the pipe when in position, and
- wherein the second plug assembly is adapted to fit over the guard when the guard is positioned over the flange, the second plug assembly further comprising a third portion in the form of a sidewall extending from the periphery of a fourth portion, the fourth portion having a region made from a porous material which allows fluid to readily permeate through the second plug assembly, the region of the fourth portion aligning with the aperture in the guard and the similar region of the first plug assembly.

34. The plug set according to claim 33 wherein the third portion is flexible such that when in place it is caused to engage the pipe at a first position of the pipe remote from its end.

35. The plug set according to claim 33 wherein the third portion is clamped to the pipe using a cable tie or other clamping means.

36. The plug set according to claim 33 wherein the fourth portion is of the same or slightly larger diameter than the flange.

37. The plug set according to claim 33 wherein the plug set or a component thereof is impact resistant.

* * * * *